Patented Mar. 12, 1946

2,396,515

UNITED STATES PATENT OFFICE 2,396,515

STERILIZING PRODUCTS AND METHODS FOR MAKING THEM

Ignaz Kreidl and Werner Kreidl, New York, N. Y., assignors to Ludwig Jekels, New York, John Heller, Hartsdale, N. Y., and Ignaz Kreidl and Werner Kreidl, both of New York, N. Y.

No Drawing. Application March 20, 1943, Serial No. 479,959

4 Claims. (Cl. 167—14)

This invention relates to silver preparations suitable for antiseptic, disinfectant, sterilizing and similar purposes where silver compounds may be satisfactorily used due to their bactericidal, fungicidal, germicidal, insecticidal and similar action.

The specific action of silver and its compounds with respect to living organisms and accordingly its antiseptic, disinfectant, sterilizing and the like action is well known in the art. Especially colloidal preparations of metallic silver and silver oxide have been widely used as therapeutical agents. A large variety of silver preparations have been suggested for fungicidal purposes, for the sterilization and purification of water and for the prevention of decay or fermentation in animal and vegetable matter. Thus for example, for the purification of water it has been suggested to pass the water over silvered stones or the like, or over substances on which silver oxide has been precipitated. These methods often have been found unreliable since even distribution of the active silver in the water is hard to obtain and since the silver has a tendency at least partially to precipitate and thus to lose its effectiveness. It has also been suggested to introduce silver into water by means of electrolysis either in the form of elemental silver or of silver chloride. Although these methods appear to be fairly successful they are cumbersome and in the way of widespread commercial application. Similar methods have been suggested for the preservation of foodstuffs and beverages. Also with these methods precipitation of the active silver will not always be prevented. For the preservation of foodstuffs the use of so called silver water has been suggested. Silver water is prepared by having water in contact with a silvered material for a prolonged time until the water will be saturated with respect to silver. Such solutions have the same disadvantages, and of course, their silver content is limited by the extremely low solubility of metallic silver in water. For many purposes solutions of readily soluble silver salts have been suggested. All of these, however, are not stable under the influence of light, especially in the presence of organic matter, and have a strong tendency to react with vegetable and animal matter under the formation of inactive compounds of a dark color.

An object of the present invention is a liquid sterilizing preparation containing silver halides in aqueous solution in a greater amount than corresponds to the true solubility of the simple silver halide in pure water and which will not readily precipitate when diluted with further amounts of water. Another object of the present invention is emulsions or salves and the like prepared with such solutions. Another object of the present invention is a method for sterilizing moist and liquid materials. Another object of the present invention is a solid silver halide preparation which is soluble in aqueous liquids in greater amounts than corresponds to the true solubility of the simple silver halide and which can be dissolved within a predetermined range of concentration without being decomposed. Another object of the present invention is a method for preparing such solid silver halide preparations. Another object of the present invention is sterile or sterilizing materials being impregnated with such a solid silver halide preparation. Another object of the present invention is a method for preparing such impregnated materials.

In a copending application of same date, namely application S. N. 479,957 of March 20, 1943, for disinfectant products bactericidal and the like silver solutions are described which are stable to light and will not readily react with organic matter. As is stated in this copending application stable solutions of the silver halides of chlorine, bromine and iodine may be obtained by having in solution the silver halides in the presence of an excess of halide in the form of soluble halides of the halide acids of chlorine, bromine and iodine, or in the form of the halogen acids themselves. Without restricting this invention to any theory it is assumed that the stability of such solutions may be due to the formation of complex silver halide compounds. It need not be mentioned, however, that not all of the excess halide will or need participate in the said complex formation, but, as appears to be witnessed by the increased solubility of the silver halides in more concentrated halide solutions, the formation of complex-like silver halides seems to be favored by increasing concentration of the halide type compounds.

In preparing solutions according to the copending application the silver may be introduced in any convenient form, preferably, however, in the form of a readily soluble silver salt, such as silver nitrate, silver acetate, or silver sulfate and the like. Wherever the introduction of anions other than halide is undesired, the silver may be introduced in the form of the not readily soluble simple silver halides of chlorine, bromine and iodine, or in the form of its oxide. However, in this case, solution will be greatly aided by the application of heat. The excess halide may be introduced in the form of any halide capable of bringing into solution more of the simple silver halide than corresponds to its solubility. Thus, for example, the halogen acids of chlorine, bromine, and iodine may be used. By way of example the following soluble halides of these acids are named: alkali metal, alkali earth metal, aluminum, copper, bismuth, lead and cerium chlorides, bromides and iodides. In certain cases, the use of halides in amounts where the cation may be capable of forming complexes, such as excess ammonia, will not be desirable, since the effectiveness for certain uses may be impaired.

Generally speaking, and especially where such silver preparations are to be used for the treatment of the human body, or in connection with foodstuffs or other materials for human consumption, the use of alkali halides for the introduction of excess halide will be preferable due to their neutral and non-poisonous character, such as, especially, common salt and potassium chloride. Also the non-poisonous alkali earth metal halides; that is, calcium, and magnesium chloride will be advantageous, the high solubility of calcium chloride offering further advantages.

For dissolving each given amount of silver, a certain amount of halide will be necessary, and the maximum amount of silver which may be dissolved will be dependent on the maximum amount of the halide which may be dissolved in the solution. No definite rules for determining the amount of silver which can be brought into solution by a given amount of halide can be established theoretically, but this amount can be easily determined by simple experiment. Generally speaking, for any increase in the concentration of the halogen furnishing compound, the concentration of silver which can be brought into solution will increase at a much greater rate. Roughly speaking, solutions containing the same amount of the various halogens will dissolve approximately the same amount of silver.

It was found that the effectiveness of such silver halide solutions may be improved for many purposes if they are allowed to act in an acid medium, preferably a slightly acid medium. For this purpose other acids than halide acids, if compatible with the silver halides, may be used. By slightly acid, as is well understood by those in the art, we mean acidities between neutrality and about pH 3, preferably closer to about pH 3, without, however, restricting the inventions to any particular pH. The selection of a suitable pH will largely depend on the actual use of the preparation. Other acidities will be desirable in the treatment of wounds as in the preservation of foodstuffs, while in other fields of application the selection of any particular pH may be only of slight value.

Although, the theory of the action of the excess halide is not quite understood, and the actual molecular structure of such combination products does not form part of the invention, it may be assumed that those silver halide products owe their increased stability to a complex formation of the simple silver halide (AgCl, AgBr, AgI) with other substances of the halide type. By a substance of the halide type, a halogen compound is to be understood which, according to its basic formula, has an anionic Cl' group, Br' group, or I' group and, accordingly, may be a derivative of the corresponding halide acids or may be such an acid itself, however, disregarding the fact whether or not in the particular combination it is bound in complex form. Thus, for example, if the basic formula of the compound would be $Ag.Hal.(Hal.M)_x$ substantially all of the halide can be allotted to compounds of the general type $M.Hal$ that is $M'\cdot Hal^-$; although actually they may bound in complex form, such as in a theoretical halogeno compound: $AgHal_2\cdot M\cdot$. The term "halogeno compound," as used here, refers to a type of compounds which sometimes are referred to under this name, and which correspond to the general formula $AgHal_xM_y$, where Hal is a halogen and $x$ a number between 1 and 4, and $M_y$ the stoichiometric amount of a cation including hydrogen. In this connection it may be mentioned that the term "halogen ions" or "silver ions" wherever they will be used throughout the specification and the appended claims is to be understood as indicating Hal or Ag as used in the above formula regardless of the fact whether they are in the ionized state or not.

The present invention is based on the discovery that the stability of such solutions as described in the said copending application towards dilution may be regulated and accordingly increased by adjusting the ratio of halogen ions to silver ions according to the desired stability towards dilution or in other words dependent on the maximum degree of dilution to which such solutions are to be subjected. In the investigation of the behaviour of such aqueous solutions it was found that for each concentration of halogen in the solution a certain amount of silver ions may be introduced. Furthermore, it was found that the higher the concentration of halogen ions the higher will be the amount of silver which may be introduced, the ratio of halogen to silver ions being the smaller the higher the absolute halogen ion concentration in the solution. Accordingly, the present invention consists in adjusting the ratio of halogen to silver ions in a sterilizing preparation to the maximum degree of dilution to which such a preparation is to be subjected. For example, if such a silver preparation is to be used as a solution which is fairly concentrated with respect to silver and which is to be used for the treatment of substances which have a low water content, such as moist solid substances or solid water containing gels and the like, a fairly low halogen acid ratio in a solution fairly high in halogen may be used since further dilution of the silver preparation due to contact with said materials having a low water content will be relatively small. In case, however, such a silver preparation is to be mixed with an aqueous liquid in a manner that this liquid should only be slightly diluted by the addition of said silver preparation and accordingly the resulting solution will be relatively low in halogen, a fairly great halogen to silver ratio will have to be used to warrant that precipitation will be substantially avoided. Less care or in other words a less exact determination of the halogen to silver ion ratio may be exercised where the final dilution is of such a magnitude that the resulting silver concentration is not higher than corresponds to the true solubility of the simple silver halide in pure water. In this case only an intermediate formation of a more or less colloidal simple silver halide may occur which, however, will be readily redissolved if dilution is carried out at not too slow a speed.

The present invention will greatly extend the field of application of silver halides for bactericidal and the like purposes with respect to the type of preparations heretofore known and to those of the general type described in the above mentioned copending application. For many purposes of purification, sterilization or for any number of antiseptic, therapeutic, fungicidal, germicidal, bactericidal, insecticidal and the like purposes it will be of great importance that the introduction of the active agent does not bring about too great a dilution, while the introduction thereof in liquid form will be necessary to warrant reliable and even distribution. For such purposes the present invention will offer a means to prepare stock solutions which can be readily incorporated into the substances to be treated, whether they be aqueous liquids or water containing solids, since the adjustment of the halogen silver ratio of the stock solution makes it possible to adapt it to withstand the dilution encountered during the treatment of said substances. In this manner it will be obtained that the silver preparation will stay completely dissolved and, accordingly, evenly and effectively distributed.

It was found, and this forms an important part of our invention, that such stable soluble silver halide compounds will not coagulate proteins and thus will not have any of the undesirable properties of the hitherto known silver disinfectants or other protein coagulating antiseptics. This property of the silver halide solutions according to this invention renders them particularly useful where they are to be used for bacteriostatic action in the treatment of the human body.

Consequently, it appears that the adjustment of the halogen to silver ion ratio renders it possible to prepare solutions which may be diluted to any desired degree. Theoretically, the ratio for any desired dilutability could be determined by determining the ratio necessary to hold the silver in solution at the concentration desired for the diluted solution. However, it was found, and this forms an important part of our invention, that the ratio of the concentrated solution which is to be stable towards dilution may be appreciably lower than would be deduced from the above theoretical consideration. It appears, without restricting our invention to the theory, that if the ratio is held within certain limits, dilution can be effective without the danger of precipitation, thus leading to what generally may be called a super-saturated solution. In order to make this clearly understood we will first illustrate how the necessary ratio of halogen to silver ions may be determined while the super-saturation effect will be illustrated by showing that appreciably lower ratios than those found from theoretical determinations can be used for practical application. This discovery is of great importance because it makes possible to prepare concentrated solutions of a relatively low halogen to silver ion ratio which can be subjected to arbitrary dilution whereby the fact that this ratio is much lower than the one which would be determined by theoretical calculation allows to have a much higher silver concentration.

The theoretical halogen to silver ion ratio preventing precipitation for any specified dilution may be easily determined by experiment. For determining this ratio it will be only necessary to determine the amount of halogen necessary to dissolve the amount of silver which is to be kept in solution at the required maximum dilution, provided that this amount of silver is well above the true solubility of the simple silver halide. Accordingly, to find the theoretical halogen to silver ion ratio for such a silver halide preparation which can be diluted without precipitation to any desired degree and down to infinity it will be necessary only to determine the minimum amount of halogen necessary to dissolve the first measurable increase in the silver concentration over the amount soluble in the form of the simple silver halide in pure water. The ratio of this amount of halogen to the excess silver over that introduceable as the simple silver halide will give the required theoretical ratio. The maximum silver concentration of such a dilutable solution will be determined by the maximum amount of halogen which can be introduced into it, a factor which will largely depend on the specific compound used. Where not infinite dilutability but only dilution to a certain predetermined silver concentration is desired the theoretical halogen ion to silver ion ratio may be determined in exactly the same way by determining the amount of halogen necessary to keep the desired silver concentration dissolved at the predetermined maximum dilution. Thus, for example, if such a silver halide preparation should be capable of standing dilution without precipitation until $x$ is the silver concentration of the diluted preparation and it is found that at this dilution $y$ is the concentration of halogen ions necessary to keep the silver in solution, the halogen to silver ratio for the concentrated solution will be $y:x$. If the concentrated solution can dissolve $z$ times as much halogen ions as are necessary to keep the silver dissolved in the diluted solution it can be seen that the most concentrated stock solution which can be prepared for this halogen silver ion ratio will contain $z$ times $y$ halogen ions and $z$ times $x$ silver ions. In some cases it will be desirable to adjust the required ratio to a certain halogen concentration in the diluted solution. In such cases all one has to do is, of course, to reverse the above procedure.

Actually lower ratios than those determined by the above theoretical considerations can be used and as a rule, particularly for solutions having not too high a halogen concentration about a fifth to a tenth of the theoretical ratio can be safely used, most likely due to the fact that on dilution a certain supersaturation for silver can be attained. This discovery is of importance for our invention, since in consequence thereof for any desired dilutability lower ratios than theoretically determined may be used. Thus for example, an infinitely dilutable solution may be prepared from a solution having a chlorine to silver ion ratio of about 1200, while the theoretical value would be about 6000 to 10,000. The required practical ratio for any desired dilutability may be easily determined by experiment.

So as to be able to introduce as much silver as possible into solutions of great dilutability, that is into solutions having a relatively high halogen to silver ion ratio, it will be advisable to use as highly soluble halide type compounds, since, of course, the higher the absolute concentration in halogen the greater will be the absolute concentration in silver for any given ratio.

One of the great advantages of the relatively concentrated solutions which may be prepared according to this modification of our invention is that they may be used as stock solutions which may be readily dissolved or diluted wherever use is to be made of such active silver halides. The advantage of such relatively concentrated solutions becomes clear if one considers that for most practical applications very small concentrations of silver such as of a magnitude of $10^{-5}$ to $10^{-7}$ g. per cc. water and even much less will be effective. Accordingly such stock solutions will make it possible to treat relatively large quantities of aqueous liquids with relatively small amounts of the active stock solution. Such stock solutions, for example, may be used with great advantage for the treatment of liquids such as milk, alcoholic beverages, fruit juices and the like or they may be added to emulsions and the like such as butter without the danger of precipitation as long as the halogen silver ratio is adjusted to the maximum dilution which may be encountered in such a treatment. Such solutions may be used as disinfectant materials, as deodorants, for example, for body hygiene and the like. Such solutions may be incorporated into salves or emulsions and many other possible applications will be apparent to those skilled in the art.

The halogen silver ratios which may be used in accordance with the present invention may vary within wide limits dependent on the dilutability desired and the absolute concentration of the non-diluted solution. Thus, for example, for a chlorine containing solution the ratio will be about 1200 by weight. The ratio for the other halogens will be similar when calculating them on an equimolecular basis, that is, reducing the weight of the other halogens to that of the equimolecular amount. The higher the absolute halogen concentration of the stock solution the lower will be the ratio necessary to have it withstand the same dilution than for one having a lower halogen concentration, while as mentioned above for diluting either of such stock solutions to the same final silver concentration they will have to have the same halogen silver ratio.

The approximate ratio for infinite dilutability as well as the theoretical dilutability as given in the preceding paragraphs applies to aqueous solutions at room temperature only. The solubility of silver in halide ion containing solutions, however, is dependent on the temperature to quite some degree. It will be understood readily that, accordingly, for temperatures deviating from room temperature the useful halogen silver ratios will have to be changed in accordance with the change in solubility. It need not be explained in detail that for any given temperature above and below room temperature, the required ratios for infinite and limited dilutability can be easily determined.

The temperature effect on solubility can also be utilized in another way. Change in temperature as a rule also influences the solubility of the halide introducing compounds and as usual an increase in temperature will increase the solubility of such compounds. Accordingly, it will be possible to prepare stock solutions of a given halogen to silver ratio which contain substantially more halogen and silver as can be arranged at room temperature. Of course, when using such hot stock solutions they have to be diluted at least to such a degree that the resulting solution is not oversaturated for the halogen compound of silver.

The required halogen to silver ratio for any given dilutability will also be substantially affected when utilizing the process according to the present invention in connection with colloidal solutions, emulsions, or suspensions, the non-aqueous phase of which (in most cases the dispersed phase) is capable of adsorbing silver or silver halide respectively. When utilizing stock solutions according to the present invention in connection with such liquids containing at least one second phase it was found that the solubility for silver for any given halogen ion concentration may be seemingly increased. This apparent increase in solubility probably may be explained by the fact, that one part of the silver will be in true solution while another part may be adsorbed on one of the phases of the colloidal solution, emulsion, suspension or the like. The halogen to silver ion ratio may be easily determined in an analogous way to that described in preceding paragraphs of this specification for true solutions. Of course, in the case of such colloidal solutions or the like it will not be feasible to determine the required ratio by observing incipient turbidity on dilution, since due to the turbidity of such colloidal solutions or the like incipient silver halide precipitation will not be easily observed. Also, in given cases on dilution silver halide may be precipitated on one of the phases thereof and thus be kept in suspension. However, such precipitated silver halide will become apparent by the fact that it will be sensitive to light, such as sunlight or ultra violet light, and when exposed to such light will show a discoloration, an effect which, in accordance with analogous phenomena, may be called solarization. Accordingly when utilizing the present invention in connection with such colloidal or the like solutions the required halogen to silver ion ratio, for example for infinite dilutability may be determined by finding the lowest ratio at which any degree of dilution will not lead to solarizing effects. It is obvious that the required halogen silver ratio, due to the apparently higher solubility of silver in such colloidal solutions or the like, will be less than in the case of true solutions. Accordingly where for treating such colloidal or the like solutions true solutions are utilized as stock solutions, it may be advantageous to use such hot stock solutions as described above, which also allow a reduced halogen silver ratio for any given concentration. Such hot stock solutions may also have the advantage that while mixing the stock solution with the colloidal solution or the like that they may facilitate the adsorption process and prevent precipitation which may be caused by the fact that the adsorption process may lag behind the dilution of the stock solution in the aqueous phase of the colloidal solution or the like. Of course, also in this case the stock solution may be prepared with a portion of the colloidal solution or the like.

Thus, if milk was used as a colloidal solution which is to be treated according to the present invention, it was found that the apparent solubility of the simple silver chloride is $$2-5 \times 10^{-5} \text{g.AgCl/cc.}$$

milk (corresponding to about 1, 2 to $$3 \times 10^{-5} \text{g.Ag/cc.}$$

milk); that means that on introducing such an amount of silver-chloride no solarization effect is observable. Correspondingly, for infinite dilution in milk halogen silver ratios expressed in chlorine silver ratios of at least about 70 to 200 were found suitable; that means when starting with any concentration of silver and a ratio of at least between about 70 to 200 no further dilution caused any discoloration of the milk in sunlight or ultra violet light. When adding such a stock solution to milk it was found that, if the final concentration of Ag in the milk was about $3 \times 10^{-6}$, fermentation was delayed for one or two days as compared with untreated milk, while, when having a concentration of about .8 to $2 \times 10^{-5}$ g.Ag/cc. milk, even after five days no noticeable fermentation was observed. The low halogen silver ratio required for introducing silver into milk has the obvious advantage that for the required amounts of silver only small and barely noticeable amounts of halogen have to be introduced. Other colloidal solutions, emulsions, suspensions and the like, the non-aqueous phase of which is capable of adsorbing silver, will behave in analogous manner, the halogen silver ratio for any desired dilutability, of course, being dependent on the specific nature of the non-aqueous phase. Of course, also for colloidal solutions and the like the actual ratios will vary for different temperature ranges.

The present invention, however, is not only of great importance and utility for the preparation of liquid silver halogen preparations, but also for the preparation of solid silver halogen preparations.

Such silver and halogen containing preparations in solid form which have a halogen silver ion ratio which is adjusted so that they will dissolve in any predetermined dilution will be of particular utility for a variety of applications for which the above mentioned solutions are either not useful at all or where the use of a solution is not desirable. In many cases, however, they may be used interchangeably with such solutions or as a handy raw material for making the same.

The determination of the halogen silver ratio for such solid preparation is, of course, identical with the one for the solutions the desired concentration of the dissolved preparation furnishing the yardstick for the determination of the halogen silver ratio. Accordingly, for determining this ratio it will only be necessary to determine the amount of halogen necessary to keep the silver in solution at the maximum dilution which such a solid preparation should stand when being dissolved without leading to any substantial precipitation, provided that this amount of silver in this maximum dilution is greater than corresponds to the true solubility of the simple silver halide.

Of course, all the other rules and descriptions given in connection with such liquid preparations will apply to the use of the said solid preparations by applying them accordingly and they need not be repeated in this connection since they will be obvious to those skilled in the art. Instead of the stock solutions mentioned in the earlier parts of this description, the solid preparations may be used as if they were a 100% solution. If such solid preparations are dissolved it may be advantageous to dilute them slowly or to dissolve them in a hot medium, so as to be sure that no precipitation will occur. Dilution in hot media which later may be let to cool may also be advantageous in the case of liquid preparations.

The solid silver and halogen containing preparations according to the present invention may be prepared in various ways without departing from the spirit of the invention. The following methods are given by way of example only and other methods of preparing them will be apparent to those skilled in the art. Thus, for example, such a solid preparation may be made by intimately mixing a silver salt, preferably a soluble silver salt and a soluble halide so that the halogen silver ion ratio of such a mixture will be in accordance with the principles of this invention. It will be quite advantageous to take care that such a mixture will be very intimate and the grain size of the salts very small so that no lag insolubility is obtained. The more readily soluble both of the salts are the easier it will be to dissolve the mixture. Of course, more even distribution and intimate mixture will be obtained in melting together such salts in the desired ratio. Another way of preparing such solid preparations will consist in preparing a solution containing the said salts in the desired ratio and then eliminate the water from said solutions, for example, by evaporation. It may be preferable to remove the water rapidly from such solutions in preparing said solid preparations for example, by the application of heat or/and vacuum. Both in the case of melting together the components or in the water removal process, the silver may be assumed to have at least partially taken a place in the halide lattice. In any case where such soluble silver halide preparations of a predetermined halogen to silver ion ratio are prepared by precipitation from solutions or a melt care has to be taken that excess halide precipitates first or at least simultaneously with the silver halide since otherwise such precipitates will not be light stable.

A particularly useful application of the present invention is sterile or sterilizing materials the activity of which is caused by an impregnation with such a dry or solid silver halogen preparation. Of course, such impregnations will not be permanent for repeated use inasmuch as they are soluble in water, at least to a predetermined degree, but they will be particularly effective due to the readiness with which the active silver preparation will be dissolved and thus penetrate into any moist or wet surroundings. They have the further advantage that as well on storage as during their use they will show practically no discoloration, since they are practically stable to light, especially if they have fairly high halogen silver ion ratio. According to the ultimate use for which such impregnated materials are intended the halogen to silver ion ratio will be adjusted in accordance with the principles of this invention. If such an impregnated material is to be used in contact with only slightly moist substances or under any other circumstances where it will come in contact with small amounts of water only, such as in a damp atmosphere, the halogen to silver ion ratio may, of course, be much lower than if they are intended to be used in contact with larger amounts of water. It will be easily understood that the present invention will be particularly useful for such material as bandage or the like gauzes, which will retain their white color although being impregnated with a highly active silver preparation. Such gauzes and the like may be prepared in such a way that although they have a highly effective silver concentration they still will not contain a very great amount of halides. Such a gauze when, for example, coming in contact with a wound, will readily give off the active silver preparation and the whole moisture secreted by the wound will be evenly penetrated by the silver preparation and accordingly keep the wound area disinfected.

Especially for such impregnated materials the use of hygroscopic halides for the introduction of the excess halogen may be of particular advantage. If such hygroscopic halides, such as calcium halide are used the impregnated substances will not only be sterilizing when in contact with wet media, but will be self-sterilizing all the time. Of course, for some purposes less hygroscopic halides may be preferred. Such medium hygroscopic impregnation may be used, for example, for self-sterilizing handles and the like. Such hygroscopic impregnations may also be of great advantage for bandage gauzes since they will be self-sterilizing and also keep the bandages from drying out.

The impregnation of such materials may be conveniently made by soaking the material with one of the solutions as are described in the earlier parts of this specification and then drying the soaked material, if desired under the application of heat or in vacuo. Alternatively the carrier may be first impregnated with a soluble silver salt such as silver nitrate and then with a halide solution, the two baths being adjusted so as to apply the desired halogen to silver ion ratio on the carrier will be retained thereon. Such a procedure has the advantage that the concentration of the solutions is independent of the desired ratio, while in the first mentioned method the silver content of the impregnating bath is limited by ratio chosen in dependence of the solubility of the halide used. The amount of silver retained on the impregnated material, of course, may be adjusted both by adjusting the amount of solution used and the concentration of the solution. Other methods of impregnation will be apparent to those skilled in the art.

One of the great advantages of such dry or solid preparations is that they may be used as a concentrate which may be readily dissolved and can easily be shipped to any place of usage. The advantage of such concentrates becomes apparent when one considers that for most practical applications very small concentrations of silver will be effective, such as concentrations of about $10^{-5}$ to $10^{-6}$ g. Ag per cc. and less. Thus for the treatment of 1000 kg. water a dry preparation prepared from 4 kg. common salt and 3.3 g. silver nitrate will be highly effective and can be dissolved without any danger of precipitation. If desired first a concentrated solution may be prepared which then is incorporated in the bulk of the liquid to be treated. Such concentrates may be used with advantage for the treatment of water in camps or for the treatment of beverages, such as milk, alcoholic beverages, fruit juices or the like.

The present invention may be illustrated by the following examples:

*Example 1.*—By adding a silver nitrate solution to a sodium chloride solution a solution is prepared which will contain 30% by volume sodium chloride and $3.6 \times 10^{-4}$ g. silver nitrate per cc. The halogen silver ion ratio accordingly will be about 760 and the silver concentration will be about $2.3 \times 10^{-4}$ g. Ag per cc. Such a solution can be readily diluted four times without the slightest trace of opaqueness, while when diluting it between four to sixty times it will show slight opaqueness, which, however for most purposes will be entirely harmless. At greater dilutions which come into the range of the simple silver chloride solubility in pure water the solution, of course, will be again entirely clear.

*Example 2.*—A solution containing 30% by volume sodium chloride and $2.5 \times 10^{-4}$ g. silver nitrate per cc. is prepared in the same way as in Example 1. The halogen silver ratio accordingly is roughly 1140. Such a solution can be infinitely diluted without any precipitation at all. Thus, diluting four times will give an entirely clear solution which still contains about fifty times as much silver than corresponds to the true solubility of silver chloride in pure water. Of course, this solution can be still more diluted without becoming ineffective.

*Example 3.*—A solution is prepared which contains 56% by volume sodium bromide and $2.6 \times 10^{-4}$ g. silver nitrate per cc. and accordingly has a halogen silver ion ratio when reduced to the corresponding chlorine value of about 1160. This solution will be infinitely dilutable and even when diluted more than 50 times still contains more silver than corresponds to the solubility of the simple silver bromide.

*Example 4.*—A solution containing 55% by volume calcium chloride and $4.6 \times 10^{-4}$ g. silver nitrate per cc. and accordingly having the same halogen silver ion ratio as the solution of Example 3 will behave exactly like the solution described in the said example.

*Example 5.*—A solution capable of being diluted with 30% water may be prepared by introducing 55% by volume calcium chloride and $3 \times 10^{-3}$ g. silver nitrate per cc. and thus leading to a halogen silver ratio of about 175.

*Example 6.*—A solution which may be diluted with 100% water and yielding thus a concentration of about $3 \times 10^{-4}$ g. Ag per cc. may be prepared by introducing 55% by volume calcium chloride and $1 \times 10^{-3}$ g. silver nitrate per cc. corresponding to a halogen silver ion ratio of about 550.

*Example 7.*—A solution which may be diluted with 150% water and leading to a silver concentration of about $1.7 \times 10^{-4}$ g. Ag per cc. may be prepared by introducing 55% by volume calcium chloride and $7 \times 10^{-4}$ g. silver nitrate per cc. corresponding to a halogen silver ion ratio of about 760.

*Example 8.*—An infinitely dilutable solution having a low halogen concentration but still yielding effective action when diluted twenty times and more may be prepared by introducing 2.5% sodium chloride and $2 \times 10^{-5}$ silver nitrate per cc. corresponding to a halogen silver ratio of about 1160.

*Example 9.*—A solution similar to the one of the preceding example is prepared by introducing 2.5% calcium chloride and $2 \times 10^{-5}$ g. silver nitrate per cc. corresponding to a halogen silver ion ratio of about 1160.

*Example 10.*—To an aqueous solution, containing 25% sodium chloride silver chloride is added so as to have a chlorine to silver ratio of about 190. 10 cc. of this solution are added to 1000 cc. milk so as to at least substantially delay fermentation thereof. Preferably the silver solution and/or the milk will be heated to about 50° C. or more prior to mixing them.

*Example 11.*—A hot (about 90° C.) saturated aqueous solution of sodium chloride having silver chloride added to establish a chlorine silver ratio of about 70 is prepared. ½ to 1% of this hot solution are added to milk, preferably hot milk.

*Example 12.*—A powder for sterilizing purposes is prepared by intimately mixing extremely fine crystals of sodium chloride and silver nitrate, the percentage of silver nitrate being about .08%. Such a mixture will have a halogen silver ion ratio of about 1160 and will be easily soluble and can be diluted infinitely or dissolved down to infinitely small concentrations.

*Example 13.*—50 g. calcium chloride and .06 g. silver nitrate are dissolved in water and the water is then rapidly evaporated. The resultant powder which has a halogen silver ion ratio of about 760 may be readily dissolved down to concentrations of $1.7 \times 10^{-2}$ g. Ag per 100 g. water.

*Example 14.*—4.5 kg. sodium bromide and 2.1 g. silver nitrate are melted together under thorough stirring and cooled down. The resulting powder has a halogen silver ratio when reduced to the chlorine equivalent of about 1200 and may be dissolved down to any desired dilution.

*Example 15.*—A wound dressing gauze is impregnated with a solution containing 2.5% calcium chloride and $2 \times 10^{-3}\%$ silver nitrate and dried thereafter. The gauze will stay colorless and may be brought into contact with any amount of water without causing precipitation, and even for excessive amounts of water it will furnish enough of the active silver halide preparation.

*Example 16.*—An intimate mixture of 90 parts sodium chloride and ten parts of silver nitrate is dissolved in hot water to a concentrated solution. ½ to 1% of this hot solution are added to milk, preferably hot milk.

This invention is not limited by any of the above examples but is to be understood in its broad scope as given in the appended claims. However, in some cases the silver iodine preparations may be not quite as effective as the silver chlorine and silver bromine preparations. As far as the solubility conditions are concerned they will behave exactly the same way and one compound may be readily substituted for the other. In the same way any other silver compound may be substituted for the silver nitrate in the examples as has been indicated in the earlier part of the specification.

The solubility rules and accordingly the rules for determining the halogen silver ratios are by no means restricted to water. Aqueous solutions such as diluted alcohols and so forth will behave in exactly the same way. Of course the term "true solubility" in such cases will apply to the true solubility of the simple silver halide in the said mixed solvent. Likewise the present invention may also be used for non-aqueous solvents provided they are solvents for the silver halides in the presence of excess halogen ions.

The term "sterilizing" wherever it may be used in the appended claims and in the specification is to be understood as comprising all the various described actions of silver, while the terms "halogen ions," "silver ions," and "simple silver halides" are to be understood as defined in an earlier part of the specification. The term "colloidal solution or the like" is to be understood to comprise emulsions and suspensions and similar two phase preparations at least one phase of which is aqueous. The term "solarization" is understood to designate discoloration or darkening of silver compounds under the influence of sunlight or ultraviolet light. Wherever "solubility" is mentioned in the claims this is to be understood for the temperature range used.

What we claim is:

1. The method of preparing a watersoluble silver halide preparation, containing more halogen than corresponds to the composition of the simple silver halide and which can be diluted to any predetermined degree which comprises combining silver with an excess of halogen over that required for the simple silver halide, the excess halogen being introduced in the form of a halide, selected from the group consisting of chlorine, bromine and iodine, and introducing silver in such an amount that the preparation will be unsaturated with respect to silver, the halogen to silver ratio being at least about 1200:1.

2. The method of preparing a water soluble silver preparation, containing more halogen than corresponds to the composition of the simple silver halide and which can be diluted to any predetermined degree, which comprises combining silver with an excess of halogen over that required for the simple silver halide, the excess halogen being introduced in the form of a halide, selected from the group consisting of chlorine, bromine and iodine, the ratio of halogen to silver being at least 500:1 and introducing the silver in such an amount that the preparation will be unsaturated with respect to silver.

3. Sterilizing preparation the effective agent of which is a silver halide preparation, said silver halide preparation containing more halogen than corresponds to the composition of the simple silver halide, the excess halogen being introduced in the form of a halide selected from the group consisting of chlorine, bromine and iodine, said silver halide preparation having a halogen to silver ratio of at least about 500:1, the silver being present in an amount below the saturation point of the said preparation for silver.

4. A sterilizing preparation according to claim 3 in which the halogen to silver ratio is at least 1200:1.

IGNAZ KREIDL.
WERNER KREIDL.